US008600982B2

(12) United States Patent
Bartomeli et al.

(10) Patent No.: US 8,600,982 B2
(45) Date of Patent: *Dec. 3, 2013

(54) PROVIDING RELEVANT INFORMATION BASED ON DATA SPACE ACTIVITY ITEMS

(75) Inventors: Nick Bartomeli, Shelton, CT (US); John Hack, Maplewood, NJ (US)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,067

(22) Filed: May 10, 2012

(65) Prior Publication Data

US 2012/0221565 A1   Aug. 30, 2012

Related U.S. Application Data

(63) Continuation of application No. 12/814,491, filed on Jun. 14, 2010, now Pat. No. 8,200,666.

(51) Int. Cl.
*G06F 17/30* (2006.01)
(52) U.S. Cl.
USPC .......................................... 707/723; 707/728

(58) Field of Classification Search
USPC .................................................. 707/723, 728
See application file for complete search history.

(56) References Cited

U.S. PATENT DOCUMENTS

| 7,634,732 B1* | 12/2009 | Blagsvedt et al. ............ 715/712 |
| 2005/0060350 A1* | 3/2005 | Baum et al. ................ 707/104.1 |
| 2005/0160080 A1* | 7/2005 | Dawson ............................ 707/3 |
| 2007/0271245 A1* | 11/2007 | Repasi et al. ...................... 707/3 |
| 2008/0005067 A1* | 1/2008 | Dumais et al. .................... 707/3 |
| 2008/0052274 A1* | 2/2008 | Moore et al. ...................... 707/3 |
| 2008/0243849 A1* | 10/2008 | Sattler et al. ...................... 707/8 |
| 2011/0078615 A1* | 3/2011 | Bier .............................. 715/779 |

\* cited by examiner

*Primary Examiner* — Mahesh Dwivedi

(57) ABSTRACT

Various embodiments of systems and methods for providing relevant information based on data space activity items are described herein. Data space activity items of a user are identified while the user is working through an application. Several context elements relevant to each data space activity item are then determined. Content locations are searched to find content items relevant to the context elements. The content items are then ranked to determine relevant information. The relevant information can be accessed by the user when required.

17 Claims, 8 Drawing Sheets

PROVIDING RELEVANT INFORMATION BASED ON DATA SPACE ACTIVITY ITEMS

CROSS-REFERENCES TO RELATED APPLICATIONS

This application is a continuation application of U.S. patent application Ser. No. 12/814,491, filed Jun. 14, 2010 now U.S. Pat. No. 8,200,666.

TECHNICAL FIELD

The field relates generally to search methodologies for providing relevant information. More particularly, the field is related to a method and system for providing relevant information based on a user's activity space in a software application.

BACKGROUND

In general, software applications try to assist users while working through a task or a process. Typically, a help catalog can be accessed to find information relevant to a particular task or process a user is currently interested in. In the case of complex software applications, such as business or process-related applications, users may need to search for relevant information that may be required to complete a task. Users spend considerable amount of time to create and refine search strings or queries to narrow down search results. However, the context in which the search is taking place may not be determined or considered in the search and therefore the most relevant information may not be retrieved despite considerable effort. Furthermore, even if users may know the type of information required, they may be unsure about how to access that information because such information may need to be accessed from a separate application. Providing information to a user that is most relevant to a current context with minimal intervention from the user would be desirable.

SUMMARY

Various embodiments of providing relevant information based on data space activity items are described herein. While a user is working through a software application, data space activity items of the user are identified. Several context elements relevant to each data space activity item are then determined. Content locations are searched to find content items relevant to the context elements. In one aspect, the content locations can be part of the accessed application. In another aspect, the content locations may also include applications that are external to the accessed application. The content items are then ranked to determine relevant information. This process of obtaining relevant information is performed without user intervention. Finally, the relevant information is displayed on the user's request.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for providing relevant information based on data space activity items are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
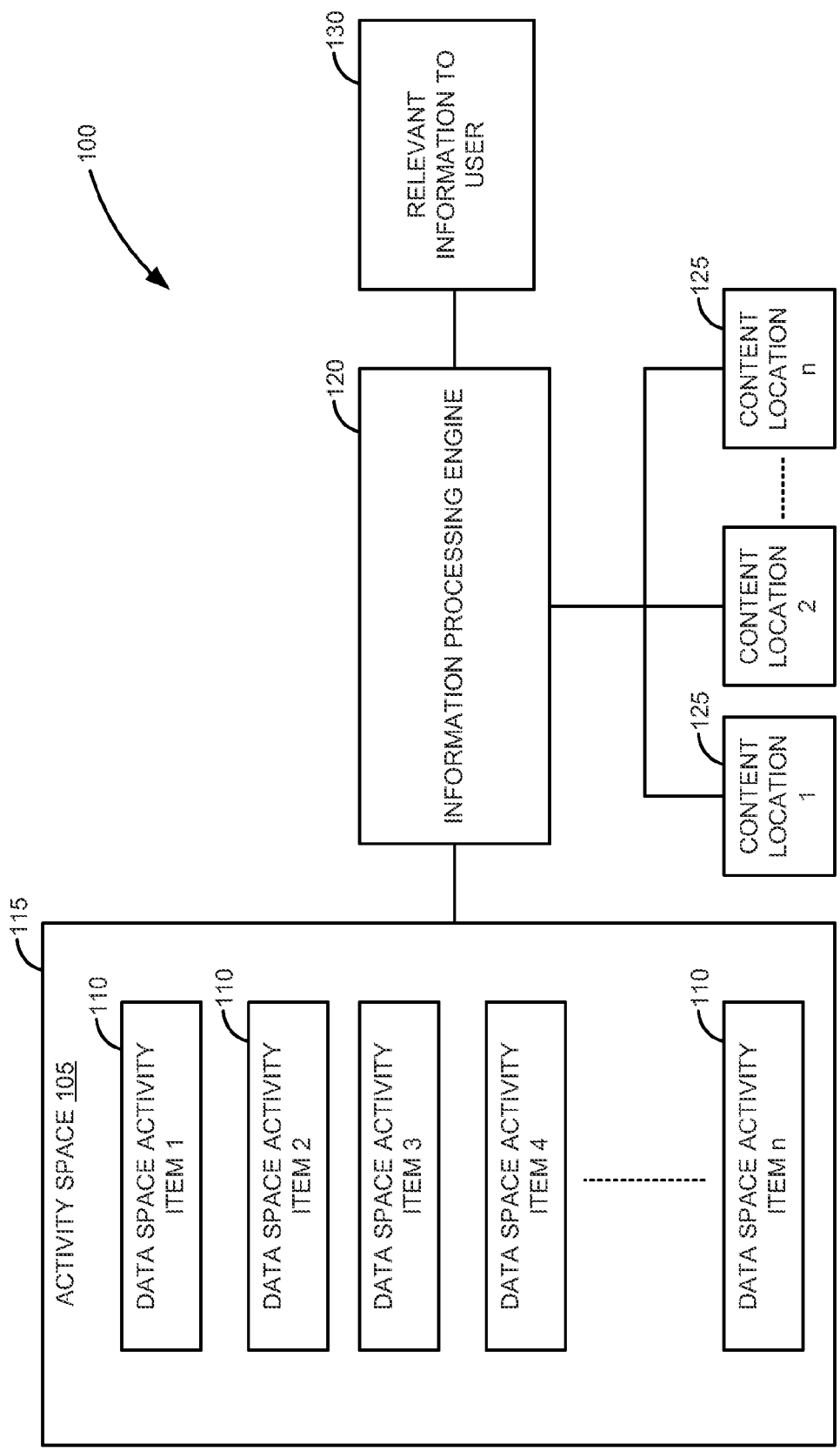
FIG. 1 is a block diagram illustrating a procedure for providing relevant information from different content locations based on a user's data space activity items, according to one embodiment.

FIG. 1 illustrates a procedure 100 for providing relevant information while a user is accessing a software system or application, according to one embodiment of the invention. The procedure 100 starts with the analysis of a user' activity space 105. At any given point or stage while accessing an application, a user's activity space may be categorized into one or more data space activity items 110. For instance, several data space activity items 110 are identified within a user's activity space 105. The data space activity items 110 include data space items of the user and activity space items of the user. In one embodiment, the data space activity items may include a process or a step which is being worked through by a user, parameters of a current view, information about a user, or other items that define attributes of a user's current data and activity space while working through an application (e.g. a functionality of SAP's Enterprise Performance Management (EPM) solutions, a product of SAP AG of Walldorf, Germany).

The data space activity items 110 are contextually subdivided by an information processing engine 120. Specifically, the information processing engine 120 determines context elements of each data space activity item 110. The information processing engine 120 is interfaced with multiple content locations 125. The content locations 125 can be within the application that is currently being used by the user or external applications that may be related to application currently being used. For example, the application currently being used may be a functionality of SAP's EPM solutions and the external applications can be other functionalities of the EPM solutions. Some of the functionalities SAP's EPM include Planning and Consolidation, Strategy Management, and Profitability and Cost Management. The content locations 125 can be document stores or repositories in the applications.

The information processing engine 120 searches the content locations 125 to find content items relevant to the context elements. In one embodiment, the information processing engine 120 includes a search federator. The content items can be of any form or type of information that is present in the content locations. For example, the content items can be documents, reports, and user data. The information processing engine 120 then ranks the content to determine the most relevant information. The relevant information is then made accessible to the user at 130.

Figure 2:
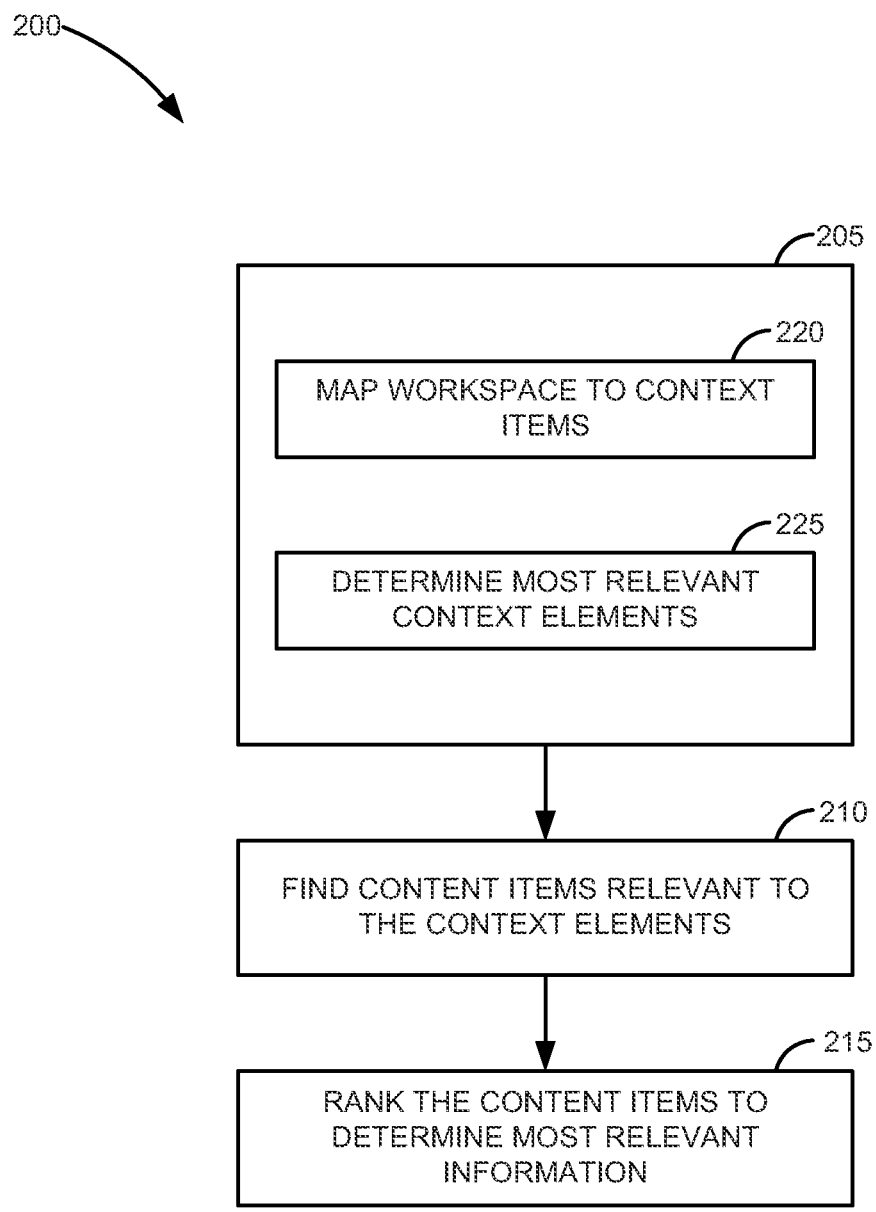
FIG. 2 is a block diagram illustrating an information processing procedure, according to one embodiment.

FIG. 2 illustrates an information processing procedure 200 according to one embodiment of the invention. The information processing procedure 200 can be divided into three steps, namely, a preprocess step 205, a search step 210, and a postprocess step 215. In the preprocess step 205, most relevant context elements of the data space activity items are determined. In one embodiment, the type of a user's data and activity space is first mapped to the context items at 220. The most relevant context elements are determined at 225 and then used by the search step 210. At the search step 210, the content locations are searched to find content items relevant to the context elements. In the post-process step 215, the content items are ranked for determining the most relevant information. To rank the content, the content items can be initially weighted for relevancy with the context elements. The more relevant information would be the content items with relatively more weight. This process organizes the search results from the search step 210 in the order of their relevancy with the context elements. The above described information processing procedure 200 is performed without a specific user request.

Figure 3:
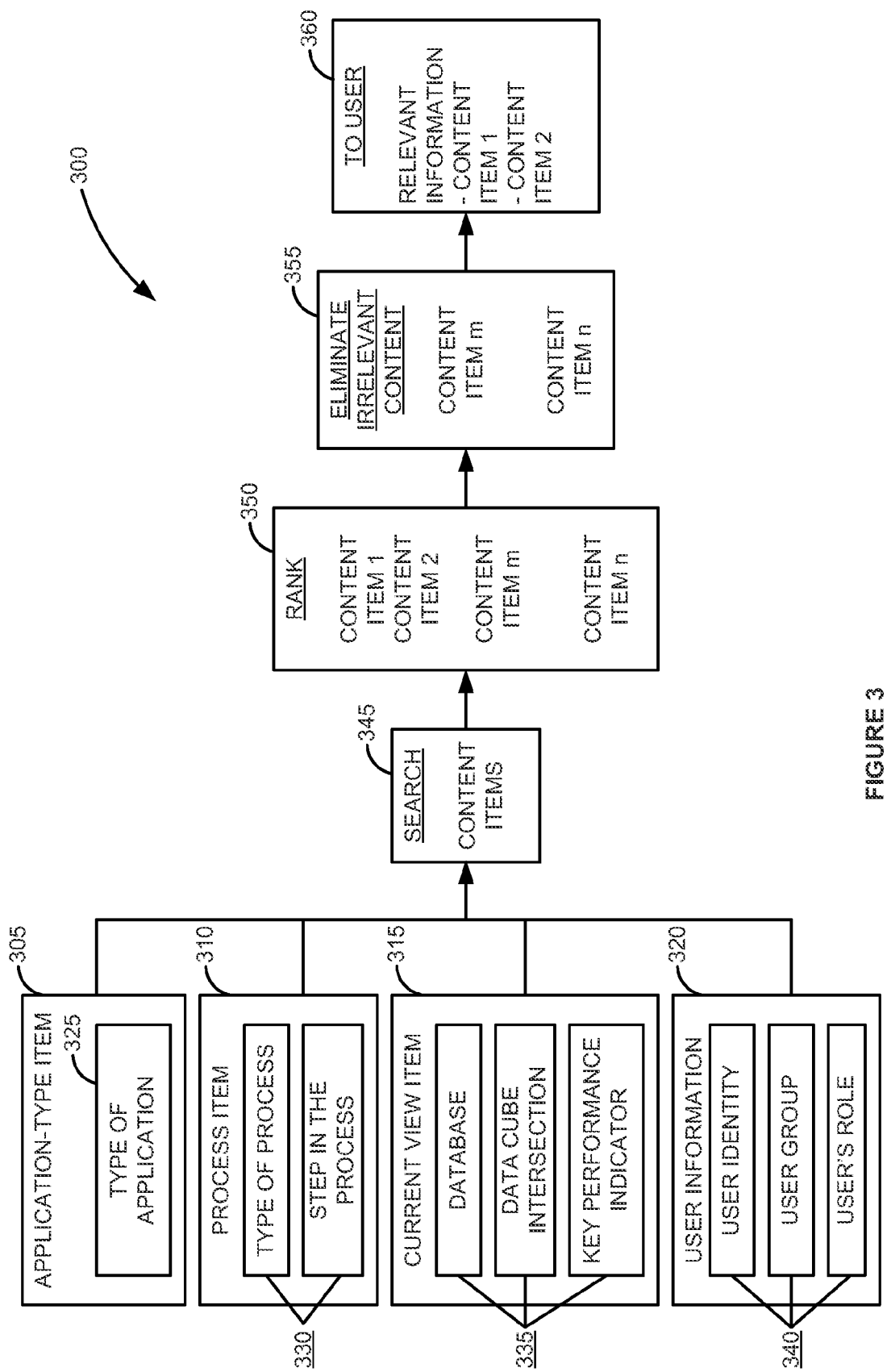
FIG. 3 is a block diagram illustrating a procedure for searching and processing search results, according to one embodiment.

FIG. 3 illustrates a procedure 300 for searching and processing search results using context elements according to one embodiment of the invention. In this embodiment, the data space activity items include an application item 305, a process item 310, a current view item 315, and a user information item 320. Context elements for each data space activity item are then determined. The context elements 325 for application item 305 can be the type or function of application. For example, the type of application can be a particular functionality of a software solution (e.g. a functionality of SAP's EPM solutions, a product of SAP AG) that may include areas such as financial performance management, planning and consolidation, strategy management, and profitability and cost management.

The context elements 330 for the process item 310 can be about the nature or type of the process and the step in the process in which the user is currently in. The context elements 335 for the current view item 315 can be about relational data elements which can have information about the database to which the user is connected to, intersection in a data cube, and key performance indicator. User identity, groups to which the user belongs, and role of the user can be the context elements 340 for the user information item 320.

After the context elements are determined, content locations are searched at 345 to find content items relevant to the context elements. In one embodiment, the content items can be ranked by first assigning weights indicative of the degree of relevancy. At a given stage while accessing the application, multiple context elements can be determined. Weights can be assigned to the content items based on the number of matches a content item has with the context element. The content items can then be ranked starting from maximum weight to minimum weight. Therefore, the most relevant information is the content item with maximum weight and highest or top ranking. Relevant and irrelevant information items can therefore be determined based on their rank. Content items with top few ranks (e.g. content item 1 and content item 2) can have the relevant information needed for the user. In one embodiment, irrelevant information, i.e. items beyond a certain rank, can be eliminated at 355. The relevant information can be accessed by the user at 360 when required.

Figure 4A:
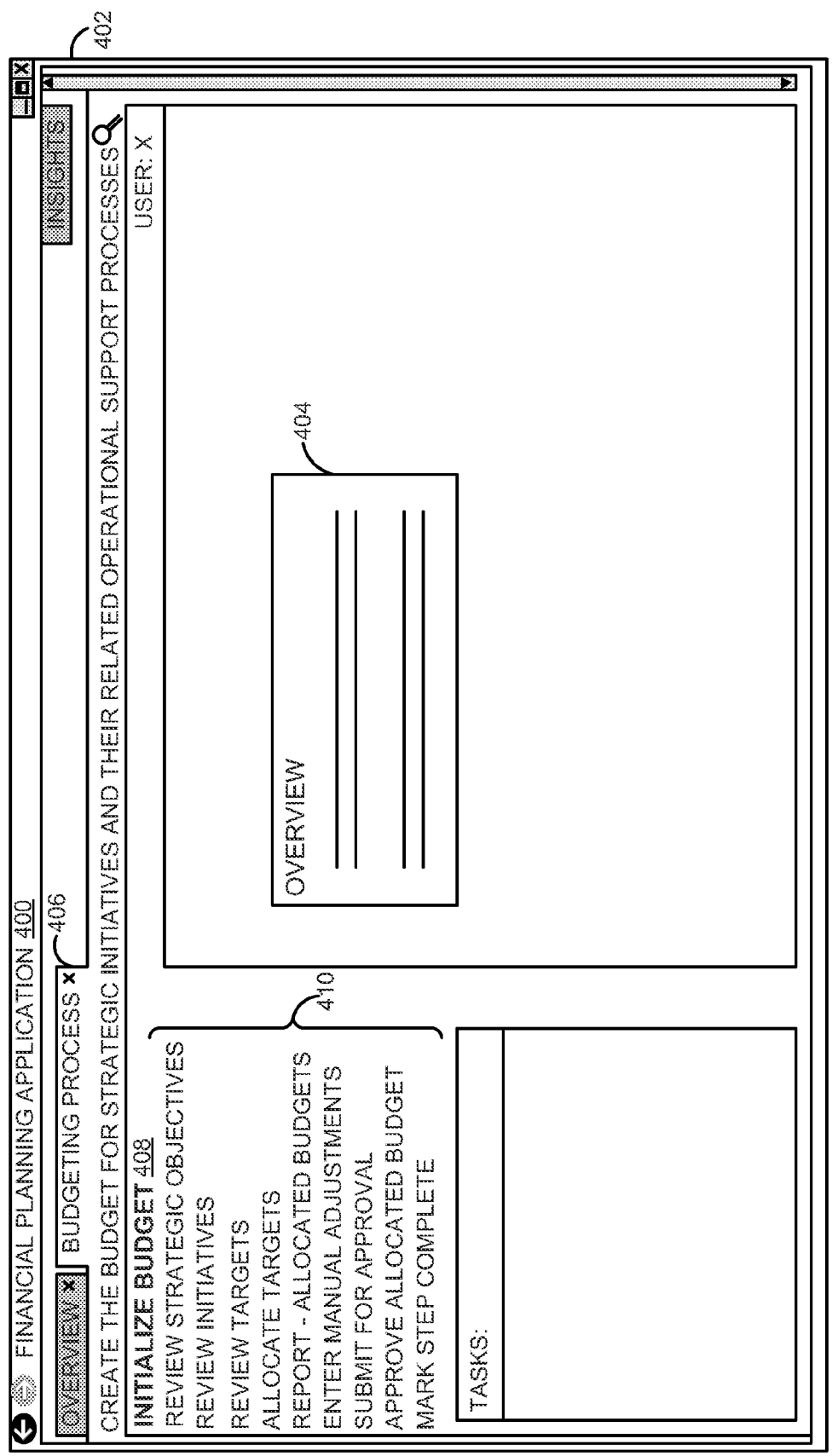
FIGS. 4A-4C illustrate user interfaces in an exemplary financial planning application.
Figure 4B:
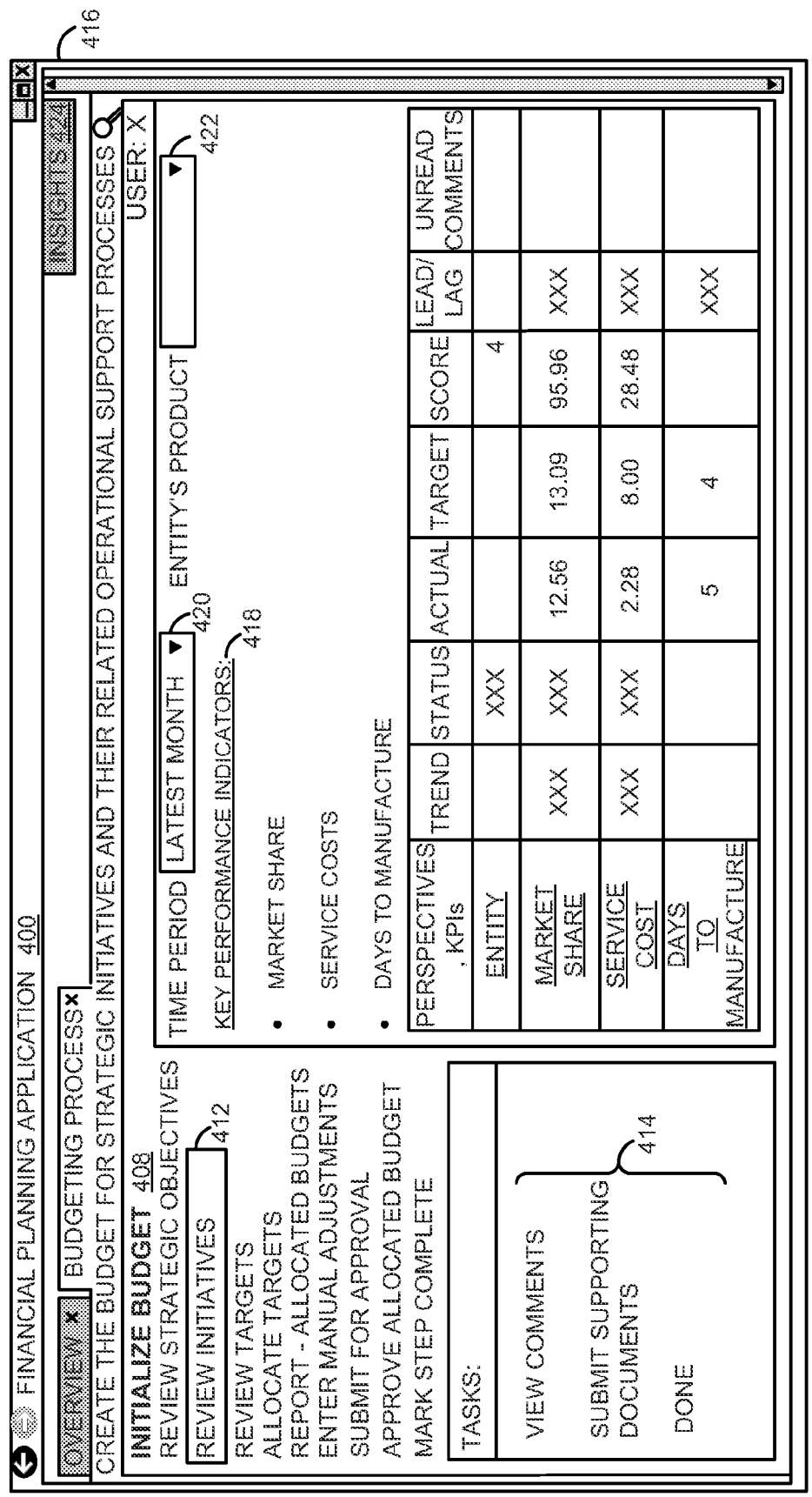
Figure 4C:
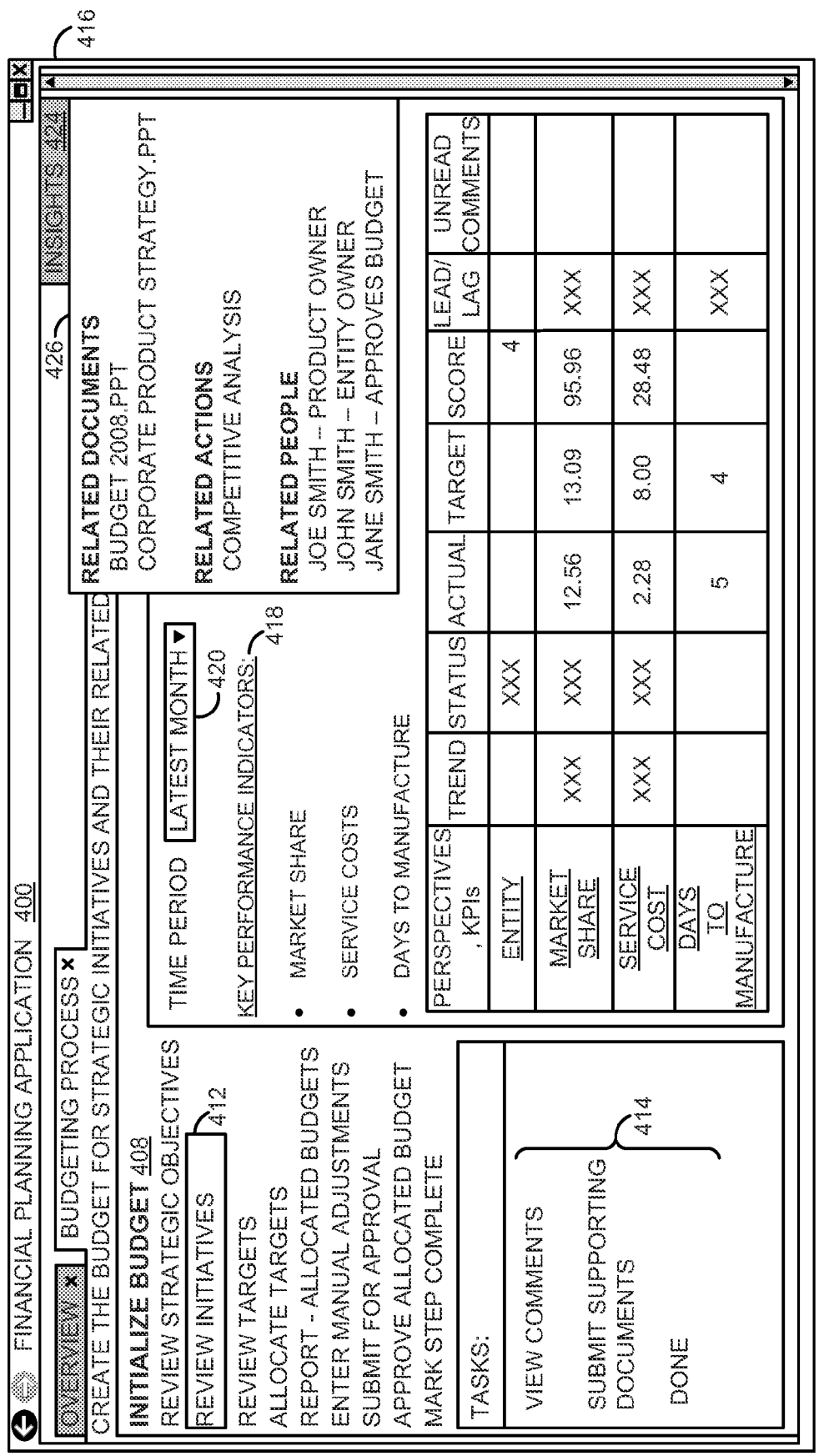

Referring to FIGS. 4A to 4C, an embodiment of a procedure for providing relevant information is described using a financial planning scenario as an example. A user can access a business or financial planning application 400 to perform several tasks related to a company. For example, a user can access the planning application 400 to perform budget-related tasks. Initially, the user may be required to log in to access the planning application 400. The user can select a budgeting process 406 in the planning application. The user can then be directed to a main page 402, as shown in FIG. 4A, where the user can be presented with an overview 404 of the budgeting process 406 and information about steps in the budgeting process 406.

The budgeting process can include a main step and sub-steps under the main step. The main step 408 can include "Initialize Budget." The sub-steps 410 include, for example, Review Strategic Objectives, Review Initiatives, Review Targets, Allocate Targets, Report on Allocated Budget, Enter Manual Adjustments, Submit for Approval, Approve Allocated Budget, and Mark Step Complete. The sub-steps 410 may not need to be performed in the same order as specified above. Also, the sub-steps 410 can be optional and some processes may not include sub-steps.

After the user selects the main step 408, the data space activity items can be identified. The data space activity items can include an application item, a process item, a current view item, and a user information item. The context elements for each data space activity item at the main step are then determined. Below is the list of data space activity items and their respective context elements:

Application Item
   Type: PLANNING
Process Item
   Type: BUDGET
Current View Item
   Category: BUDGET
   Entity: NAME OF A COMPANY
   Time: YEAR
User Information Item
   User Name
   User Group
   User Role A context element for the application item can include the type of application, i.e. a planning application element. A context element for the process item can include the type of the process, i.e. a budget element because a "budgeting process" is selected by the user. Context elements for the current view item can include relational data elements pertaining to the current view, i.e. the main step view where budgeting of an entity is being initialized for a particular year. Therefore, the context elements for the current view item can include an entity element, a time dimension element, and a category element. The entity element can be a name of a particular business or a segment of a business. The time dimension element can be referring to a current year, quarter, or month. The category element can also include the budget element in this case because the main step is "initialize Budget." These context elements for the current view can represent at an intersection in a data cube. The context elements for the user information item can include name of the user, role of the user, and group to which the user belongs to.

The user may perform some actions or tasks, if any, in the main step. The user may then select a sub-step. For example, the user can select Review Initiatives sub-step 412. A list of available tasks 414 for the Review Initiatives sub-step 412 can be displayed in the user interface 416 as shown in FIG. 4B. The user may perform tasks 414 required for completing the sub-step 412. Depending on the sub-step, all or some tasks can be optional. For example, some sub-steps may be related to review of information and may not require any input from the user. In Review Initiatives sub-step 412, key performance indicators (KPI) 418 and their details can be viewed for a selected time period 420 and a selected product group 422. Some of the key performance indicators include, for example, market share, service cost, and days to manufacture a product.

At this point, i.e. at the Review Initiatives sub-step 412, new context elements are determined for the process item and the current view item in addition to the context elements determined at the main step. The context elements at this sub-step 412 are shown below:

Application Item
   Type: PLANNING
Process Item
   Type: BUDGET
   Step: REVIEW
   Sub-step: INITIATIVES
Current View Item
   Category: BUDGET
   Entity: NAME OF A COMPANY
   Time: YEAR
   Product: PRODUCT NAME
User Information Item
   User Name
   User Group
   User Role The additional context elements for the process item can be about a step of the process, i.e. Review Initiatives sub-step 412. Therefore, the context elements can be a review element and an initiatives element. The additional context elements for the current view item can include a product dimension element because details about a selected product group 422 are being viewed.

At any stage while accessing the application, the user may feel the need for relevant information to proceed further. For example, the user may want to have relevant information about budget requirements, format of the budget, contact person for any questions, or competitors' activities in similar products. An icon 424 can be provided on the user interface 416 for accessing the relevant information. Such relevant information can be obtained by searching content locations using the context elements, without user interaction, as described previously in reference to FIGS. 1-3.

Referring to FIG. 4C, the relevant information at the Review Initiatives sub-step 412 can be obtained by using the context elements determined at the Review initiatives sub-step 412. The user can request the relevant information by clicking on the icon 424. The relevant information 426 can then be displayed to the user. In one embodiment, the relevant information 426 can be grouped according to their type such as related documents, related actions, and related people.

Each content item obtained by searching content locations may match one or more context elements. As an example for related documents, a budget document (i.e. a content item) of a previous year is typically a 'review' of 'planning' and 'budget' of the previous year. Therefore, a search using the "planning" element, the "budget" element, and the "review" element can retrieve the budget document from a content location within the planning application 400. The budget document of the previous year therefore has three matches with the context elements at the Review Initiatives sub-step 412. The budget document can be opened in a default program or may be rendered in the user interface 416. Documents that are restricted for the user who is accessing the application are not retrieved. The content locations (125 in FIG. 1) can enforce this security feature depending on the user.

Several content items can be obtained by searching the content locations using the context elements determined at the Review Initiatives sub-step 412. Weights are assigned to the content items based on the number of exact matches with the context elements. For example, content items that match only one context item can be assigned a lower weight compared to content items with three matches (e.g. the budget document that has three matches). The content items can then be ranked starting from maximum weight minimum weight. Only content items from first rank to $n^{th}$ rank can be provided to the user. In one embodiment, a system administrator or a user preference can configure the number of content items to be provided after ranking.

To find related people such as owners or responsible person, the application item and the current view items can be used. Owners with respect to the current view item's context elements (e.g. the product element, the entity element, and the product element) can be searched across all content locations. The content items, i.e. the owners, can be ranked based on their match or association with any other context element. For example, because one of the context elements includes the 'planning' application element, the 'owners' matching with the 'planning' application can be more relevant and, therefore, assigned top or higher rank. A product owner, an entity owner, and a budget approval owner can be obtained and displayed to the user. The user can then access the owners by clicking on their name. In one embodiment, an e-mail, an instant messenger session, or a request for assistance can be automatically sent to the owner.

An example for related actions can be about competitive analysis. There may be some publicly available information about competitors' activities that can be used when creating a budget. The planning, budget, product, and time elements at the Review initiatives sub-step can be used to form a competitive analysis query. Using this query, a public information source can be queried (e.g. via the Internet) to obtain relevant information without having the user leave the application. The search is performed in background and the search results are stored for the user to review. If the user clicks on this action, the search results can be displayed. The results can be displayed in a sub-window in the application.

The above-described procedure for providing relevant information therefore uses semantic information of the data space activity items. For example, the context element 'Initiatives' (that is determined at the Review Initiatives sub-step 412) can have a different meaning in different applications and in different processes within the applications. 'Initiatives' in the context of planning and budget may be different compared to 'Initiatives' in other contexts such as profit or strategy. By using the Initiative element in combination with the planning application element and the budget element, more semantically-relevant information can be obtained.

Figure 5:
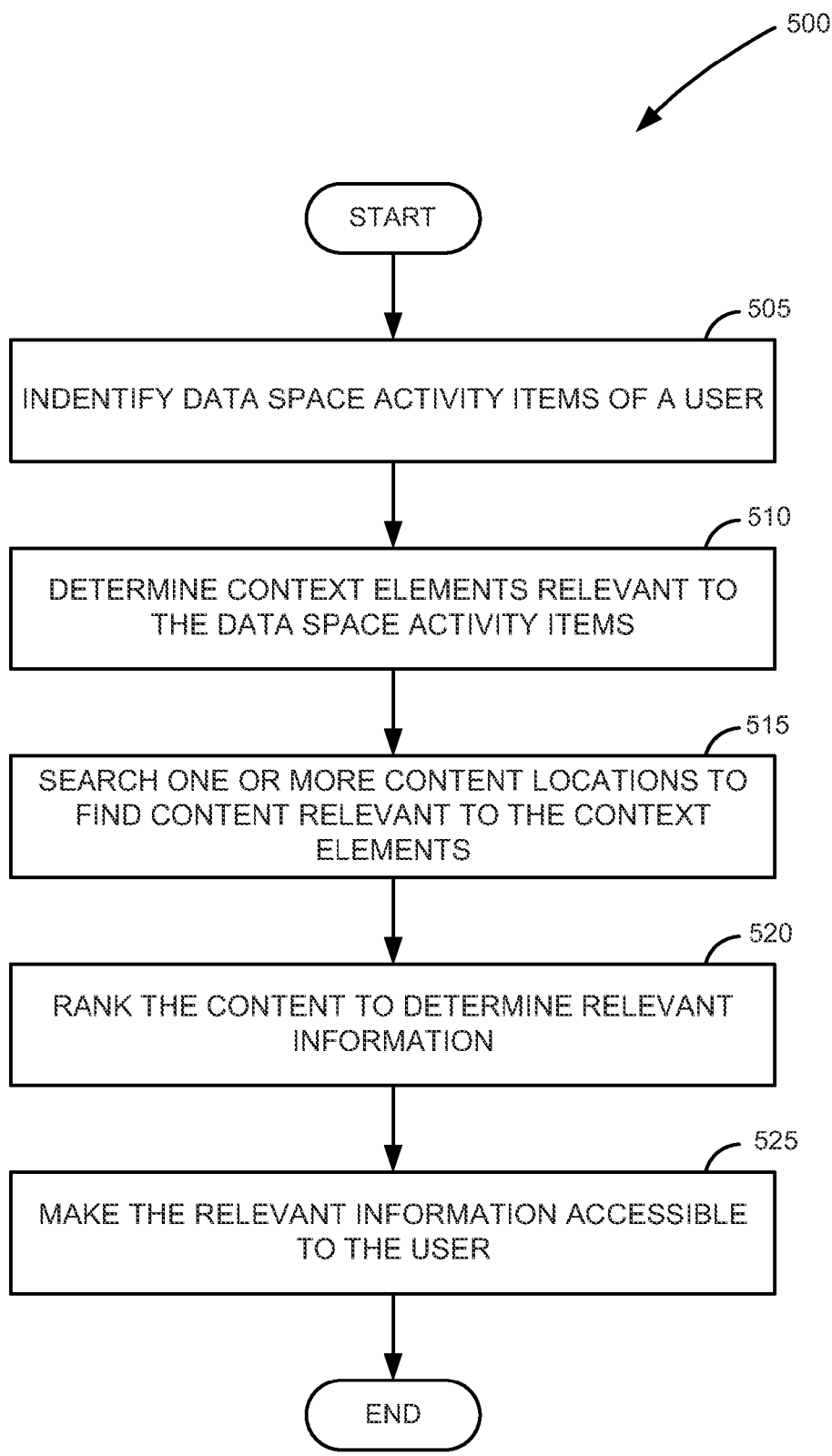
FIG. 5 is a block diagram illustrating a method for providing relevant information, according to one embodiment.

FIG. 5 illustrates a method 500 of providing relevant information according to one embodiment of the invention. Data space activity items are identified at 505. The data space activity items can include an application item, a process item, a current view item, a user information item, or other items that define attributes of the user's current activity space while working through an application. Context elements of the data space activity items are determined at 510. Specifically, each data space activity item is sub-divided contextually to determine the context elements. The context elements can include, for example, type of the application, type or step in a process in which the user is currently in, intersection location in a data cube, key performance indicator, user identity, user group, and user role.

The context elements are used to search one or more content locations to find content items relevant to the context elements at 515. The content items are then ranked to determine relevant information at 520. The content items can be ranked by assigning weights indicative of the degree of match with the context elements. The more relevant information can be the content items of top ranks, i.e. content items with relatively more weights. Finally, the relevant information is made accessible to the user at 525.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
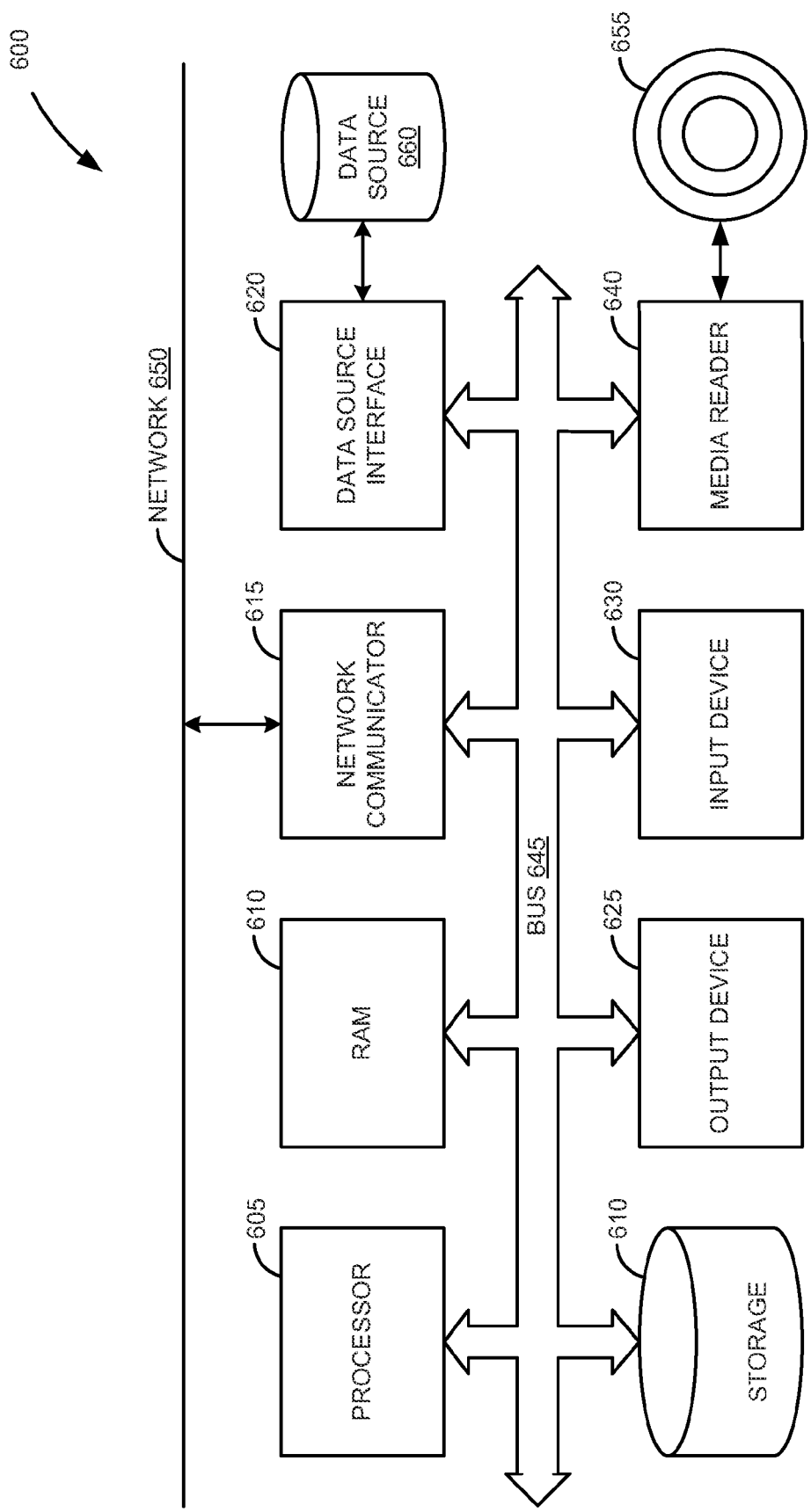
FIG. 6 is a block diagram of an exemplary computer system according to one embodiment.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 550 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
    identify one or more data space activity items of a user while the user is accessing an application, wherein the one or more data space activity items comprise an application item, a process item, a current view item, and a user information item;
    determine context elements for the one or more data space activity items, comprising:
        determine an application-type context element for the application item,
        determine a process-type context element for the process item,
        determine a relational data context element for the current view item, and
        determine a user identity context element for the user information item;
    search one or more content locations using the context elements to find content items relevant to the context elements;
    assign maximum to minimum weights to the content items based on the number of matches with the context elements;
    rank the content items from first rank to last rank based on the assigned maximum to minimum weights;
    determine content items from first rank to a specified rank as relevant information and determine content items from the specified rank to the last rank as irrelevant information; and
    make the relevant information accessible to the user.

2. The article of manufacture of claim 1, wherein the one or more content locations comprise the application that is accessed by the user, applications external to the accessed application, or combinations thereof.

3. The article of manufacture of claim 1, wherein rank the content items to determine the relevant information comprises:
    rank the content items based on their match with a context element of the context elements.

4. The article of manufacture of claim 1, wherein make the relevant information accessible to the user, comprises:
    display the relevant information upon a request by the user, wherein the relevant information comprises information required for completing a task or a process in the application that is accessed by the user.

5. The article of manufacture of claim 4, wherein determine the context elements for the one or more data space activity items, further comprises:
    determine a process-step context element for the process item; and
    determine a user group context element and a user role context element for the user information item, wherein the relevant information includes related documents, related actions, and related people.

6. The article of manufacture of claim 1, wherein the computer readable storage medium tangibly stores further instructions, which when executed by the computer, cause the computer to:
    eliminate irrelevant information after ranking the content.

7. A computer-implemented method for providing relevant information, the method comprising: a computer
    identifying one or more data space activity items of a user while the user is accessing an application wherein the one or more data space activity items comprise an application item, a process item, a current view item, and a user information item; the computer
    determining context elements for the one or more data space activity items, comprising: determining
        an application-type context element for the application item, determining
        a process-type context element for the process item, determining
        a relational data context element for the current view item, and determining
        a user identity context element for the user information item;
    searching one or more content locations using the context elements to find content items relevant to the context elements;
    assigning maximum to minimum weights to the content items based on the number of matches with the context elements;
    ranking the content items from first rank to last rank based on the assigned maximum to minimum weights;
    determining content items from first rank to a specified rank as relevant information and determine content items from the specified rank to the last rank as irrelevant information; and
    making the relevant information accessible to the user.

8. The method of claim 7, wherein the one or more content locations comprise the application that is accessed by the user, applications external to the accessed application, or combinations thereof.

9. The method of claim 7, wherein ranking the content items to determine the relevant information comprises:
    ranking the content items based on their match with the context elements.

10. The method of claim 7, wherein making the relevant information accessible to the user, comprises:
    displaying the relevant information upon a request by the user, wherein the relevant information comprises information required for completing a task or a process in the application that is accessed by the user.

11. The method of claim 10, wherein determining context elements for the one or more data space activity items, wherein the context elements further includes:
   a process-step context element for the process item, and
   a user group context element and a user role context element for the user information item, wherein the relevant information comprises related documents, related actions, and related people.

12. The method of claim 7, further comprising:
eliminating irrelevant information after ranking the content.

13. A computer system for providing relevant information while accessing an application, comprising:
   a computer memory to store program code; and
   a processor to execute the program code to:
   identify one or more data space activity items of a user while the user is accessing the application wherein the one or more data space activity items comprise an application item, a process item, a current view item, and a user information item;
   determine context elements for the one or more data space activity items, comprising:
      determine an application-type context element for the application item,
      determine a process-type context element for the process item, determine a relational data context element for the current view item, and
      determine a user identity context element for the user information item;
   search one or more content locations using the context elements to find content items relevant to the context elements;
   assign maximum to minimum weights to the content items based on the number of matches with the context elements;
   rank the content items from first rank to last rank based on the assigned maximum to minimum weights;
   determine content items from first rank to a specified rank as relevant information and determine content items from the specified rank to the last rank as irrelevant information; and
   display the relevant information upon a request by the user, wherein the relevant information comprises information required for completing a task or a process in the application that is accessed by the user.

14. The system of claim 13, wherein the one or more content locations comprise the application that is accessed by the user, applications external to the accessed application, or combinations thereof.

15. The system of claim 13, wherein rank the content items to determine the relevant information comprises:
   ranking the content items based on their match with the context elements.

16. The system of claim 13, wherein determine context elements for the one or more data space activity items, further comprises:
   determine a process-step context element for the process item, and
   determine a user group context element and a user role context element for the user information item, wherein the relevant information comprises related documents, related actions, and related people.

17. The system of claim 13, wherein the program code, which when executed further causes the processor to eliminate irrelevant information after ranking the content.

* * * * *